UNITED STATES PATENT OFFICE.

MAY KRUMP CODDING, OF SAN FRANCISCO, CALIFORNIA.

COMPOSITION OF MATTER FOR EXTRACTING AND RECOVERING MERCURY FROM SULPHID ORES.

1,402,741.   Specification of Letters Patent.   Patented Jan. 10, 1922.

No Drawing. Application filed November 27, 1917, Serial No. 204,794. Renewed June 11, 1921. Serial No. 476,964.

*To all whom it may concern:*

Be it known that I, MAY KRUMP CODDING, a citizen of the United States, and a resident of city and county of San Francisco, State of California, have invented a new and useful Composition of Matter for Extracting and Recovering Mercury from Sulphid Ores, of which the following is a specification.

My composition consists of the following ingredients combined in the following proportions:

Chile saltpetre or commercial sodium nitrate, one hundred pounds; sal soda or crystallized sodium carbonate, thirty seven and one-half pounds; salts of tartar or potassium carbonate, two pounds; alum two ounces. Sodium nitrate is a neutral salt; that is, it is not alkaline to litmus and other indicators. Sodium carbonate and potassium carbonate on the other hand are alkaline.

I dissolve the Chile saltpetre in water. I next dissolve the sal soda and salts of tartar collectively in a sufficient quantity of water to form a saturated solution.

I combine these solutions to form an alkaline bath and the resultant mixture will extract liquid mercury from sulphid ores such as ores containing cinnabar or vermilion when said ores are subjected to the action of the mixture of solutions and agitated therewith.

As permeation is essential it is obvious that the finer the ore is ground the quicker will be the extraction.

The amount of water used in the foregoing composition depends entirely upon the nature of the gangue or matrix that carries the metallic values to be recovered and is more or less variable.

During the time that the ore is subjected to the action of my composition and while the mixture of ore and solution is being agitated the cinnabar is decomposed and minute globules of mercury form.

My solution is adapted to extract mercury without the agency of heat and without producing noxious vapors or fumes injurious to man or to vegetation, is not poisonous and is easily and simply made, mixed and used.

In the case of some ores, I find it desirable to add a little alum to the solution as facilitating extraction of the mercury and assisting materially in the settling of slimes. When alum is so used, it may be added in the proportion of 2 ounces of commercial alum for the quantities of other materials stated.

My composition may be used repeatedly, but in event of its reuse it is best to revivify it between such uses by the addition of small amounts of lime. In so revivifying, I find a useful proportion of lime is about 7 pounds of quicklime for every ton of ore which has been treated with the composition.

I claim:

1. A composition adapted to extract mercury from sulphid ores which comprises an aqueous solution of Chile saltpetre containing a minor amount of sodium carbonate and potassium carbonate.

2. A composition adapted to extract mercury from sulphid ores or ore residues which consists of the following materials in about the proportions stated, one hundred pounds of Chile saltpetre, thirty seven and one-half pounds of sal soda and two pounds of salts of tartar dissolved in water.

3. A composition adapted to extract mercury from sulphid ores or ore residue which consists of the following materials in about the proportions stated, one hundred pounds of Chile saltpetre, thirty seven and one-half pounds of sal soda, two pounds of salts of tartar, two ounces of alum and water.

MAY KRUMP CODDING.